US010938172B2

(12) United States Patent
Wishart et al.

(10) Patent No.: US 10,938,172 B2
(45) Date of Patent: Mar. 2, 2021

(54) HIGH CURRENT AND RPM-CAPABLE SLIP RING ASSEMBLY

(71) Applicant: CR FLIGHT L.L.C., Carmichael, CA (US)

(72) Inventors: Randell J. Wishart, Reno, NV (US); Jonathan D. Emigh, Somerset, CA (US)

(73) Assignee: CR FLIGHT L.L.C., Sacramento, CA (US)

( * ) Notice: Subject to any disclaimer, the term of this patent is extended or adjusted under 35 U.S.C. 154(b) by 73 days.

(21) Appl. No.: 16/394,057

(22) Filed: Apr. 25, 2019

(65) Prior Publication Data

US 2019/0319415 A1 Oct. 17, 2019

Related U.S. Application Data

(63) Continuation of application No. PCT/US2017/064551, filed on Dec. 4, 2017.
(Continued)

(51) Int. Cl.
*H01R 39/08* (2006.01)
*B64D 27/24* (2006.01)
(Continued)

(52) U.S. Cl.
CPC ............. *H01R 39/08* (2013.01); *B64D 27/24* (2013.01); *H02K 1/04* (2013.01); *H02K 7/10* (2013.01);
(Continued)

(58) Field of Classification Search
CPC ......... B64C 27/10; B64C 27/12; H01R 39/08; H01R 2201/20; H02K 1/04; H02K 7/10;
(Continued)

(56) References Cited

U.S. PATENT DOCUMENTS 2,431,255 A 11/1947 Jenkins
2,456,993 A 12/1948 Rambo
(Continued)

FOREIGN PATENT DOCUMENTS

CN 1771636 A 5/2006
CN 103659129 A 3/2014
(Continued)

OTHER PUBLICATIONS

Inoue et al., English Machine Translation of JP-2008136270-A (Year: 2008).*
(Continued)

*Primary Examiner* — Tulsidas C Patel
*Assistant Examiner* — Rashad H Johnson
(74) *Attorney, Agent, or Firm* — James M. Ritchey (57) ABSTRACT

A high current and RPM-capable slip ring assembly for use in a selected application for transferring electricity between an exterior environment and an interior environment that includes multiple electrical conduction assemblies with each having a fixed exterior electrical connection disk and rotating interior electrical connection disk mounted around a non-electrically conducting spindle that has a central aperture and a central axle running through the center of the spindle with one end of the central axle connected to the selected application and the other end of the central axle connect to a supporting structure mount and an oiled porous/sintered disk sandwiched around the spindle between the interior and exterior electrical connection disks of each conduction assembly to allow easy rotation between each exterior electrical connection disk and each rotating interior electrical connection disk.

18 Claims, 8 Drawing Sheets

Related U.S. Application Data (60) Provisional application No. 62/497,937, filed on Dec. 8, 2016.

(51) Int. Cl.

| | | |
|---|---|---|
| *H02K 1/04* | (2006.01) | |
| *H02K 7/10* | (2006.01) | |
| *H02K 13/00* | (2006.01) | |
| *H02K 16/02* | (2006.01) | |
| *H02K 23/60* | (2006.01) | |
| *B64C 11/48* | (2006.01) | |
| *B64C 27/10* | (2006.01) | |
| *B64C 27/12* | (2006.01) | |

(52) U.S. Cl.
CPC .......... *H02K 13/003* (2013.01); *H02K 16/02* (2013.01); *H02K 23/60* (2013.01); *B64C 11/48* (2013.01); *B64C 27/10* (2013.01); *B64C 27/12* (2013.01); *B64C 2201/108* (2013.01); *H01R 2201/20* (2013.01)

(58) Field of Classification Search
CPC ...... H02K 13/003; H02K 16/02; H02K 23/60; B64D 27/24
USPC .......................... 310/232, 233, 234, 235, 236
See application file for complete search history.

(56) References Cited

U.S. PATENT DOCUMENTS

| | | | |
|---|---|---|---|
| 2,462,182 A | 2/1949 | Guerdan | |
| 2,833,996 A | 5/1958 | Whicker | |
| 3,738,270 A | 6/1973 | Hargett | |
| 4,056,746 A | 11/1977 | Burtis | |
| 4,259,604 A | 3/1981 | Aoki | |
| 4,375,047 A | 2/1983 | Nelson | |
| 4,645,963 A | 2/1987 | Plackner | |
| 4,938,700 A | 7/1990 | Campbell | |
| 5,067,932 A | 11/1991 | Edwards | |
| 5,089,734 A | 2/1992 | Bickraj | |
| 5,470,236 A | 11/1995 | Wissler | |
| 5,932,949 A * | 8/1999 | Ziegler | 310/236 |
| 6,433,451 B1 | 8/2002 | Cherciu | |
| 6,617,742 B2 * | 9/2003 | Lau | 310/234 |
| 6,731,041 B2 * | 4/2004 | Furuya | 310/234 |
| 8,198,773 B2 | 6/2012 | Wishart | |
| 8,253,294 B1 | 8/2012 | Wishart | |
| 8,531,072 B2 | 9/2013 | Wishart | |
| 9,561,719 B2 | 2/2017 | Lo | |
| 10,116,187 B1 | 10/2018 | Wishart | |
| 2006/0163963 A1 | 7/2006 | Flores, Jr. | |
| 2010/0113202 A1 | 5/2010 | Treichel | |
| 2010/0236849 A1 | 9/2010 | Wishart | |
| 2011/0177900 A1 | 7/2011 | Simon | |
| 2012/0206004 A1 | 8/2012 | Wishart | |
| 2016/0052382 A1 | 2/2016 | Clark | |
| 2016/0207522 A1 | 7/2016 | Pandit | |
| 2016/0244157 A1 | 8/2016 | Welsh | |

FOREIGN PATENT DOCUMENTS

| | | | |
|---|---|---|---|
| CN | 104332794 A | | 2/2015 |
| CN | 104505682 A | | 4/2015 |
| JP | 2006177375 A | | 7/2006 |
| JP | 2008136270 A | * | 12/2008 |
| WO | 2018106611 A1 | | 6/2018 |
| WO | 2019147587 | | 8/2019 |
| WO | 2019147588 | | 8/2019 |

OTHER PUBLICATIONS

ISA/US, United States Patent and Trademark Office (USPTO), International Search Report and Written Opinion dated Feb. 12, 2018, related PCT international application No. PCT/US2017/064551, pp. 1-8, claims searched, pp. 9-14.

State Intellectual Property Office of People's Republic of China (SIPO), The First Office Action, dated Apr. 15, 2020, related Chinese patent application No. 201780072941.8, pp. 1-6, English-language translation, pp. 7-11, claims examined, pp. 12-17.

ISA/KR, Korean Intellectual Property Office (KIPO), International Search Report and Written Opinion dated May 1, 2019, related PCT international application No. PCT/US2019/014594, pp. 1-11, claims searched, pp. 12-13.

ISA/KR, Korean Intellectual Property Office (KIPO), International Search Report and Written Opinion dated May 8, 2019, related PCT international application No. PCT/US2019/014593, pp. 1-10, claims searched, pp. 11-17.

State Intellectual Property Office of People's Republic of China (SIPO), The Second Office Action, dated Jun. 16, 2020, related Chinese patent application No. 201780072941.8, pp. 1-3, English-language translation, pp. 4-8, claims examined, pp. 9-15.

* cited by examiner

HIGH CURRENT AND RPM-CAPABLE SLIP RING ASSEMBLY

CROSS-REFERENCE TO RELATED APPLICATIONS

This application claims priority to, and is a 35 U.S.C. § 111(a) continuation of, PCT international application number PCT/US2017/064551 filed on Dec. 4, 2017, incorporated herein by reference in its entirety, which claims priority to, and the benefit of, U.S. provisional patent application Ser. No. 62/497,937 filed on Dec. 8, 2016, incorporated herein by reference in its entirety. Priority is claimed to each of the foregoing applications.

The above-referenced PCT international application was published as PCT International Publication No. WO 2018/106611 A1 on Jun. 14, 2018, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

INCORPORATION-BY-REFERENCE OF SEQUENCE LISTING

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Field of the Invention

The subject technology relates to a slip ring assembly that is capable of transmitting high currents at relatively high RPM values and at a low operating temperature and is frequently utilized in conjunction with a counter-rotating (CR) motor. More particularly, the subject technology comprises a series of mated and electrically isolated pairs of disks that rotate about a common axis in which current is passed between a stationary exterior environment and, when operating, a rotating interior environment, as in use with a CR motor.

2. Description of Related Art

Slip rings have existed for many decades, however, existing slip rings have two severe limitations: 1) they are mostly utilized with relatively low RPM systems and 2) they are generally not capable of transferring relatively high currents. Limited pancake or flat disk slip rings systems are known. However, these flat disk slip rings constructs include a disk on which a thin contact member rubs, essentially like a typical brush method of contact, and are known for excessive to extreme wear problems. The subject slip ring assembly is particularly useful when configured to operate with a CR motor (e.g.: a CR motor as disclosed in provisional patent application Ser. No. 62/284,535 filed on Oct. 2, 2015 and the converted original patent application Ser. No. 15/330,324 filed on Sep. 6, 2016, both of which are incorporated herein by reference in their entireties). Since CR motors have both the armature and stator rotating in opposite directions the delivery of an electrical current to the rotating field coils is not a simply process and the subject slip ring assembly achieves this function without detectable wear, over at least 100 hours, on the electrical contact members.

BRIEF SUMMARY

An object of the subject technology is to produce a slip ring assembly that delivers high currents and voltages while rotating at high RPM values and operates at relatively low temperatures.

Another objective of the subject technology is to provide a slip ring assembly sized to transmits currents with any desirable amperage and voltage, depending on the magnitudes of the desired currents.

Yet a further objective of the subject technology is to manufacture a slip ring assembly that transmits high amperages and voltages from low to high RPM values while remaining relatively cool during operation.

Still yet a further objective of the subject technology is to manufacture a slip ring assembly that transfers current with high amperages, often multiple tens of amps and higher, and high RPM values, often 12,000 RPMs and higher, while remaining relatively cool during operation.

An additional object of the subject technology is to disclose a mass-producible slip ring assembly that is adaptable to various applications for the delivery of electrical current between two locations while the subject device rotates at high RPM values, but remains relatively cool.

Disclosed is a high RPM-capable slip ring assembly for use in a selected application, frequently a counter-rotating (CR) motor or equivalent, for transferring electricity between an exterior environment and an interior environment that comprises: a non-electrically conducting spindle member which comprises: an application mounting plate and an axle extending from said application mounting plate, wherein the axle has a first end at the mounting plate and a distal second end with a central axis that extends between the first and second ends. Further included is a plurality of conduction assemblies mounted to the axle with each conduction assembly comprising: an interior conductor-connection disk with a central aperture through which the axle extends and means for an electrical connection to the interior environment; an electrically conducting spacer disk with a central aperture through which the axle extends; and an exterior conductor-connection disk with a central aperture through which the axle extends and means for an electrical connection to the exterior environment; a plurality of electrical insulator disks, each insulator disk having a central aperture through which the axle extends and positioned between each adjacent conduction assembly; a non-electrically conducting conductor housing having a central aperture through which the axle extends and is positioned proximate the axle distal end; and resilient means for applying compression to the plurality of conduction assemblies to maintain electrical transmission during operation of the slip ring assembly. Additionally, the electrically conducting spacer disk often comprises Oilite™. Further, frequently the interior conductor-connection disk and the electrically conducting spacer disk both comprise Oilite™. Also, when the interior conductor-connection disk and the electrically conducting spacer disk both comprise Oilite™, and the Oilite™ electrically conducting spacer disk is adhered to the exterior conductor-connection disk and rotates during operation with the exterior conductor-connection disk. Often, the resilient means comprises one or more springs or a wave washer mounted around said axle.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only.

DETAILED DESCRIPTION

Referring more specifically to the drawings, for illustrative purposes the subject technology is embodied in the system generally shown in FIGS. 1 through 4. It will be appreciated that the subject slip ring assembly may vary as to configuration and as to details of the components, and that the method of utilizing the subject technology may vary as to the specific steps and sequence of operation, without departing from the basic concepts as disclosed herein.

Generally, the subject technology comprises a high RPM-capable slip ring assembly for use in a selected application, frequently the selected application is a system that utilizes a CR motor or equivalent, for transferring electricity between an exterior environment and an interior environment, wherein the subject slip ring assembly comprises: a non-electrically conducting spindle member which comprises: an application mounting plate and an axle extending from said application mounting plate, wherein the axle has a first end at the mounting plate (proximate to a CR motor-utilizing device such as a drone aircraft arm) and a second end (proximate the CR motor to which the subject slip ring assembly supplies electricity) with a central axis that extends between the first and second ends. Further included is a plurality of conduction assemblies mounted about the central axle with each conduction assembly comprising: an interior electrical conductor-connection disk (fabricated of steel, various other metal alloys, and often brass) with a central aperture through which the axle extends and means for an electrical connection to the interior environment (e.g.: a wire to the CR motor); at least one electrically conducting spacer disk and often two with each having a central aperture through which the central axle extends; and an exterior electrical conductor-connection disk (fabricated of steel, various other metal alloys, and often brass) with a central aperture through which the axle extends and means for an electrical connection to the exterior environment (e.g.: a wire to the a controller and power supply); a plurality of electrical insulator disks, each insulator disk having a central aperture through which the central axle extends and positioned between each adjacent conduction assembly (for three adjacent conduction assemblies there would be two insulator disks that electrically isolate the three from each other); a non-electrically conducting conductor housing having a central aperture through which the central axle extends and is positioned proximate the axle first end (proximate to a CR motor-utilizing device such as a drone aircraft arm); and resilient means for applying compression to the plurality of conduction assemblies to maintain electrical transmission during operation of the slip ring assembly. Additionally, each electrically conducting spacer disk is often comprised of a porous/sintered material that contains a lubricant of desired viscosity and is exemplified by the readily and commercially available Oilite™ material. Further, frequently the interior conductor-connection disk and the electrically conducting spacer disk both comprise a porous/sintered material that contains a lubricant of desired viscosity and is exemplified by the readily and commercially available Oilite™ material. Also, when the interior conductor-connection disk and the electrically conducting spacer disk both comprise Oilite™, and the Oilite™ electrically conducting spacer disk is adhered to the exterior conductor-connection disk and rotates during operation with the exterior conductor-connection disk. Often, the resilient means comprises one or more springs, a wave washer mounted around said axle, and equivalent mechanisms.

Figure 1A:
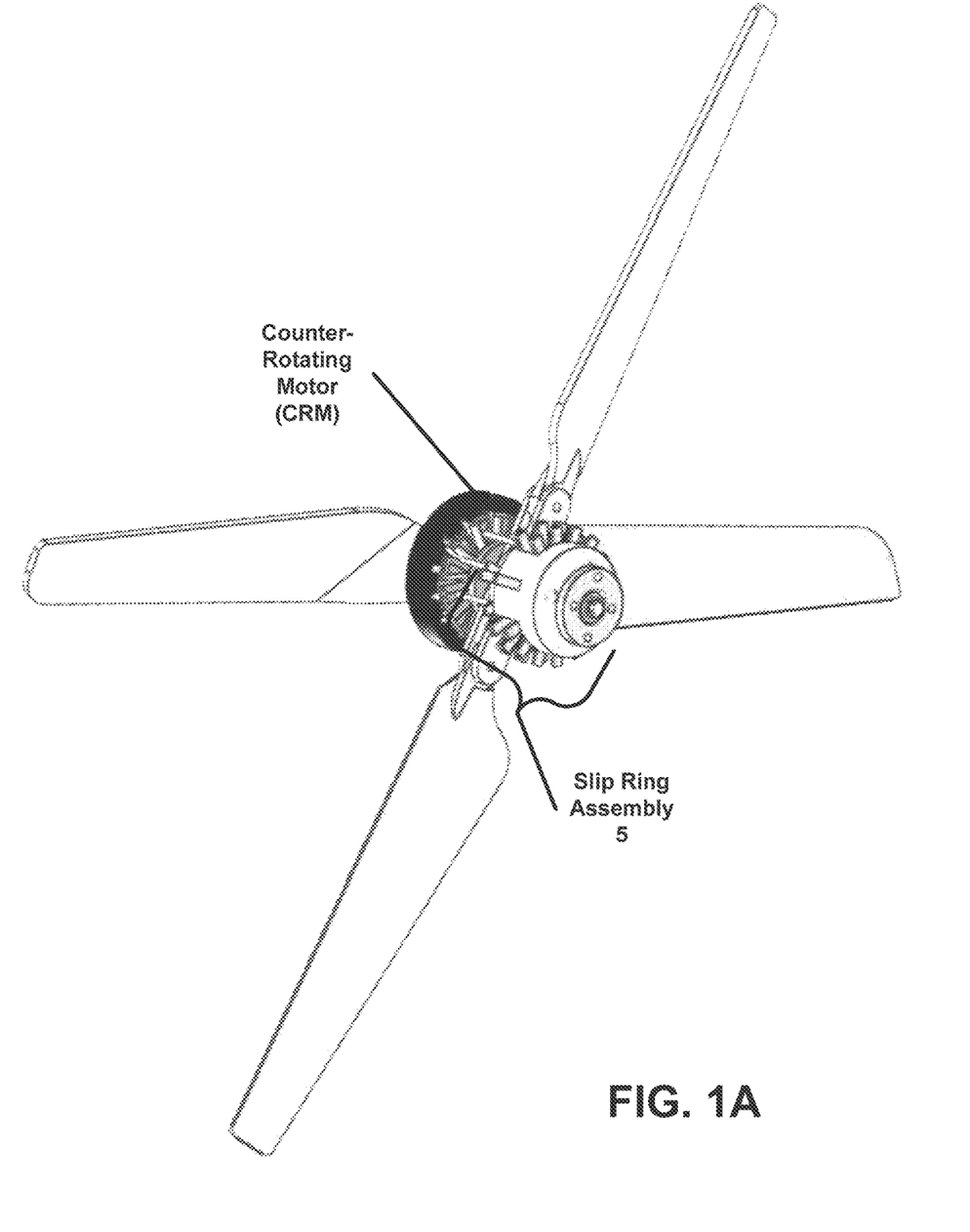
FIG. 1A is a perspective view of a first embodiment of the subject technology showing the subject slip ring assembly attached to a CR motor utilized in powering a flying drone.
Figure 1B:
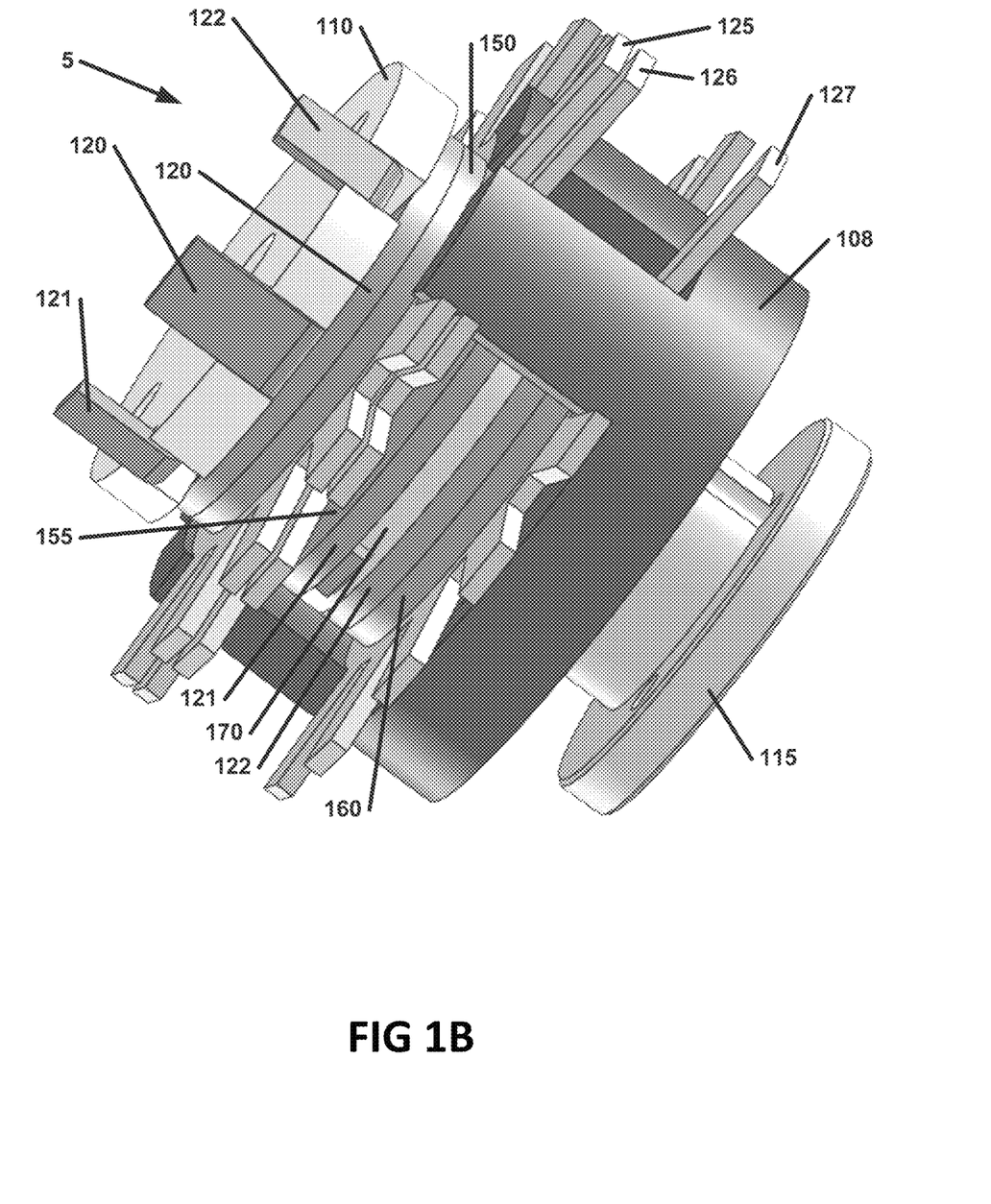
FIG. 1B is a perspective view of the first embodiment of the subject slip ring assembly.
Figure 1C:
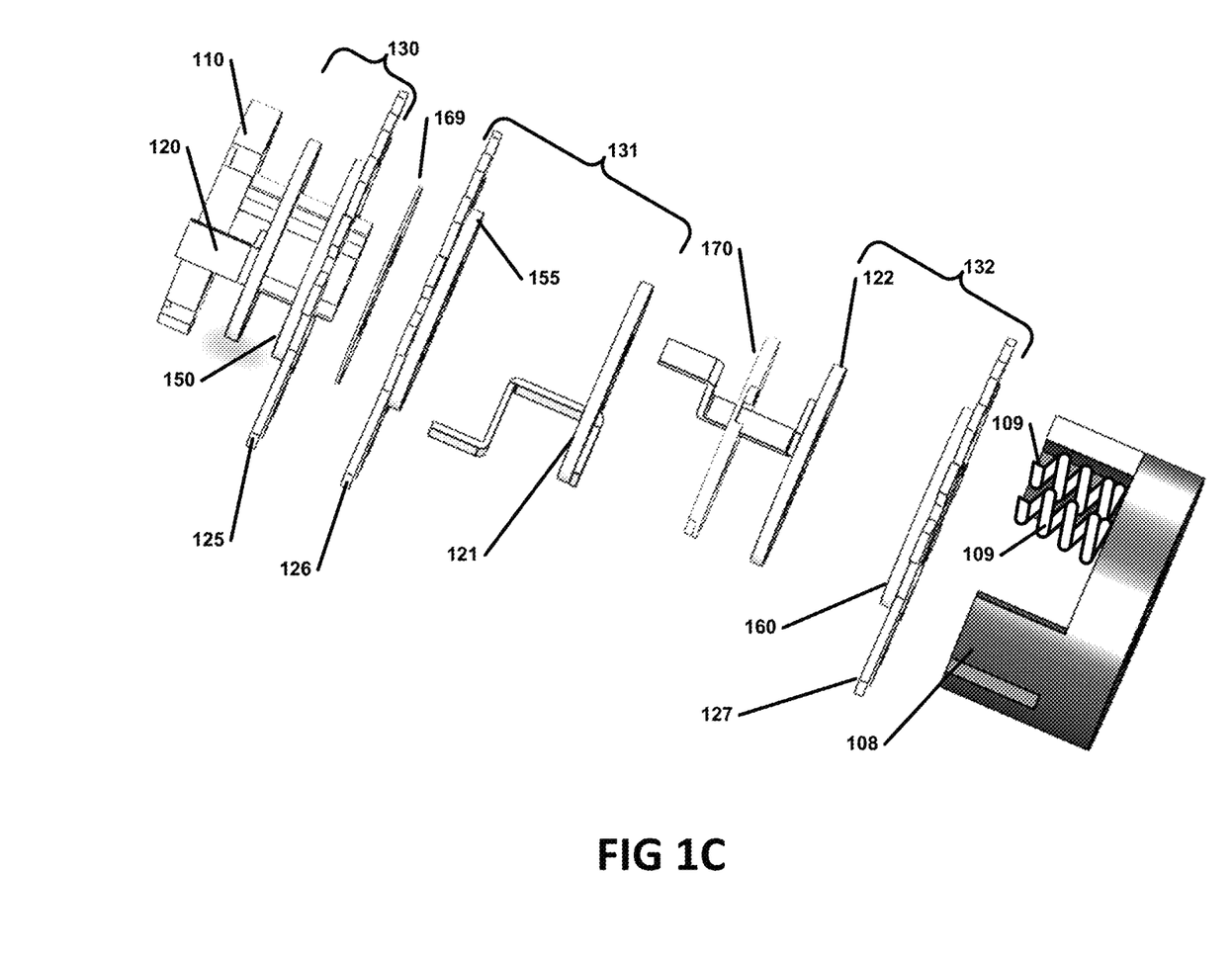
FIG. 1C is an exploded view of the first embodiment of the subject slip ring assembly.

More specifically, a first embodiment of the subject technology 5 is shown in FIGS. 1A, 1B, and 1C. For illustrative purposes only and not by way of limitation, the application to which the subject slip ring assembly is attached is a CR motor (CRM) utilized to lift drone aircraft or in an equivalent environment. The CRM has associated propellers. A detailed description an exemplary CR motor that is linked to the subject slip ring assembly is described in provisional patent application Ser. No. 62/284,535 filed on Oct. 2, 2015 and then converted into original patent application Ser. No. 15/330,324 filed on Sep. 6, 2016, both of which are incorporated herein by reference in their entireties.

FIG. 1A shows a CRM (counter-rotating motor), with oppositely rotating propellers attached to oppositely rotating stator and armature components, attached to the subject slip ring assembly 5. Generally, the exemplary efficient thin-profile CRM is utilized to power an aircraft vehicle or fan for moving a gas and includes two oppositely rotating propellers that may be mounted to horizontal flight and vertical lift-off aircraft or a fan housing in spaces similar in size to mounting spaces for traditional motors having only one propeller.

More particularly, the exemplary CRM utilized with the subject slip ring assembly comprises: a central axle having first and second ends; a first rotational member, secured to and located proximate the first end of the central axle that rotates in a first direction; a first propeller secured to the first rotational member; a second rotational member fitted about the central axle towards the second axle end; a spindle rotatably mounted around the central axle and secured to the second rotational member and rotates in a second direction that is opposite to the first rotational direction; a second propeller secured to the second rotational member; electromagnetic means associated with the first and second rotational members for powering the rotation of the first and second rotational members in opposite directions about the central shaft; the subject slip ring assembly for transmitting electricity from an exterior power source to the electromagnetic means, wherein the subject slip ring assembly is located around both the central axle and the spindle between the second rotational member and the second end of the central axle; and a mechanism configured for mounting the oppositely rotating first and second rotational members and the central axle to a supporting structure mounting mechanism, wherein the mounting mechanism is rotationally associated with the central axle and located after the subject slip ring assembly and proximate second end of the central axle.

FIG. 1B shows a close-up view of the first embodiment of the subject technology 5, while FIG. 1C shows an exploded view. A rotatable spindle 110, usually fabricated from an electrically non-conducting material such as Delrin and the like, is comprised of a CRM facing mounting plate that releasably fastens to the CRM's second rotational member by standard means such as bolts, screws, and the like and an axle region that extends away from the CRM mounting plate. A plurality of electrical conduction assemblies 130, 131, and 132 are mounted on the axle (for a three phase CRM that requires three electrical wires entering the CRM from the outside to power the field coils within the CRM, there are three conduction assemblies, but other numbers of conduction assemblies are considered to be within the realm of this disclosure). Each conduction assembly 130, 131, and 132 comprises: 1) an interior conductor-connection disk 120, 121, and 122 with a central aperture through which the central axle and the spindle 110 extends (remembering that the central axle (specifically shown in FIGS. 2 and 3) is secured to the first rotational member of the CRM and the spindle 110 is secured to the second rotational member of the CRM) and an electrical connection mechanism (usually a projecting tab formed into each connection disk 120, 121, and 122 that extends towards the CRM and parallel to the central axle and the spindle 110 for an electrical connection to the interior environment of field coils in the CRM); 2) an electrically conducting spacer disk 150, 155, and 160 with a central aperture through which the central axle and the spindle 110 extends; and 3) an exterior conductor-connection disk 125, 126, and 127 with a central aperture through which the central axle and the spindle 110 extends and a mechanism (usually a projecting tab formed on the perimeter of each exterior connection disk 125, 126, and 127 that extend perpendicular to the spindle 110 for an electrical connection to the exterior environment of a controller and power supply).

Additionally, included in the subject slip ring assembly are a plurality of electrical insulator disks 169 and 170, with each insulator disk 169 and 170 having a central aperture through which the central axle and the spindle 110 extend. Each insulator disk 169 and 170 is positioned between each adjacent conduction assembly 130 to 131 and 131 to 132. With the exemplary three conduction assembly slip ring assembly, there are only two insulator disks 169 and 170 necessary to electrically isolate the three conduction assemblies 130, 131, and 132 from each other. Further, included in the subject slip ring assembly 5 is a non-electrically conducting housing 108 that has a central aperture through which the central axle and the spindle 110 extend and is positioned proximate the distal end. The housing 108 is often fabricated from Delrin or equivalent non-conducting material and is configured with slots to secure in a stationary fashion the projecting tabs on each exterior connection disk 125, 126, and 127. The central axle is rotationally secured to a supporting structure mount 115 (see FIG. 1B).

Also, included in the subject slip ring assembly 5 is a resilient mechanism 109 that is configured to compress the plurality of conduction assemblies 130, 131, and 132 to maintain electrical transmission during operation of the subject slip ring assembly 5. The resilient mechanism may be a set of springs (see FIGS. 1C, 3A, 3B, and 4), a wave washer (see FIG. 2), or equivalent components.

Figure 2:
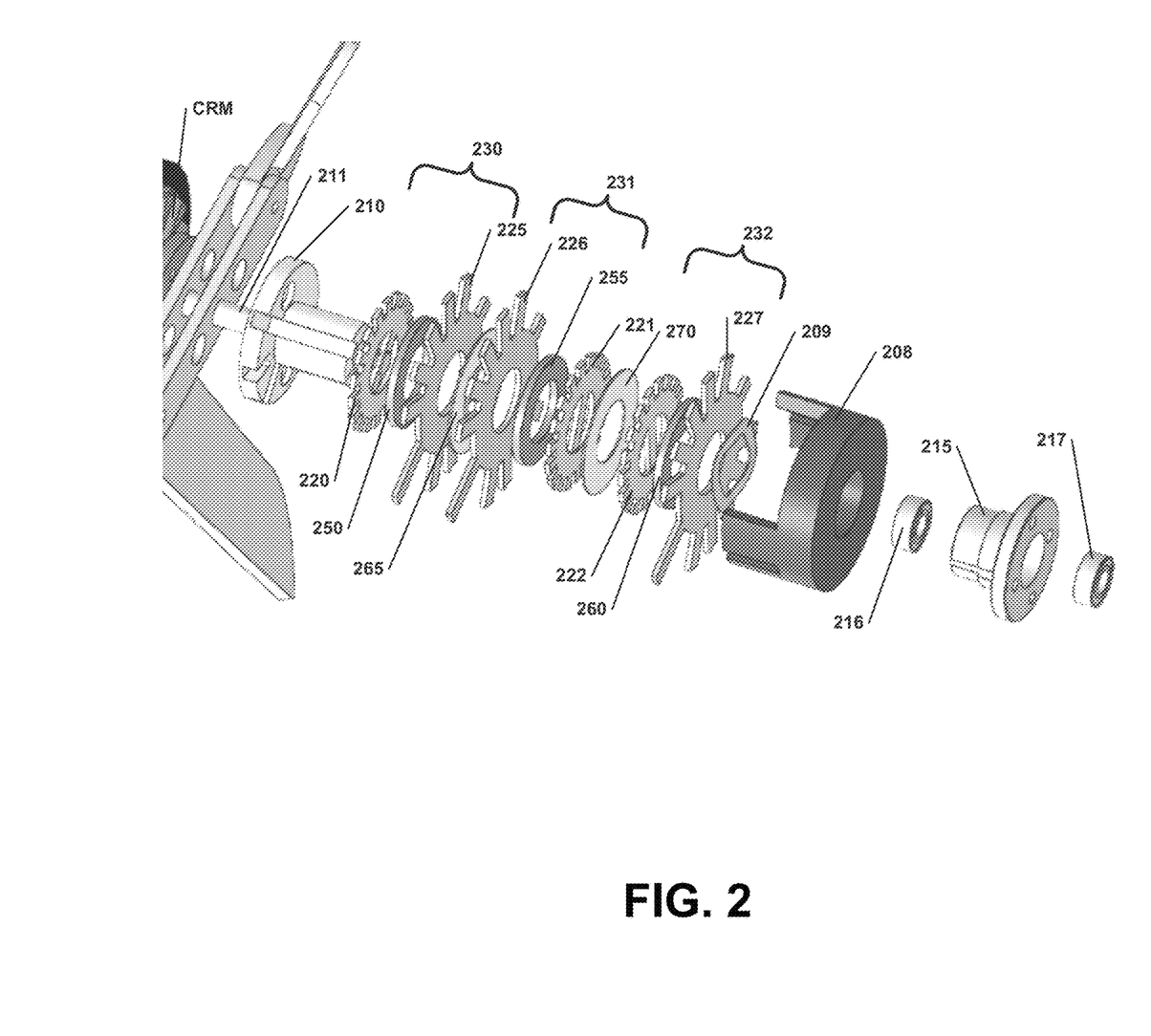
FIG. 2 is an explode view of a second embodiment of the subject technology.
Figure 3A:
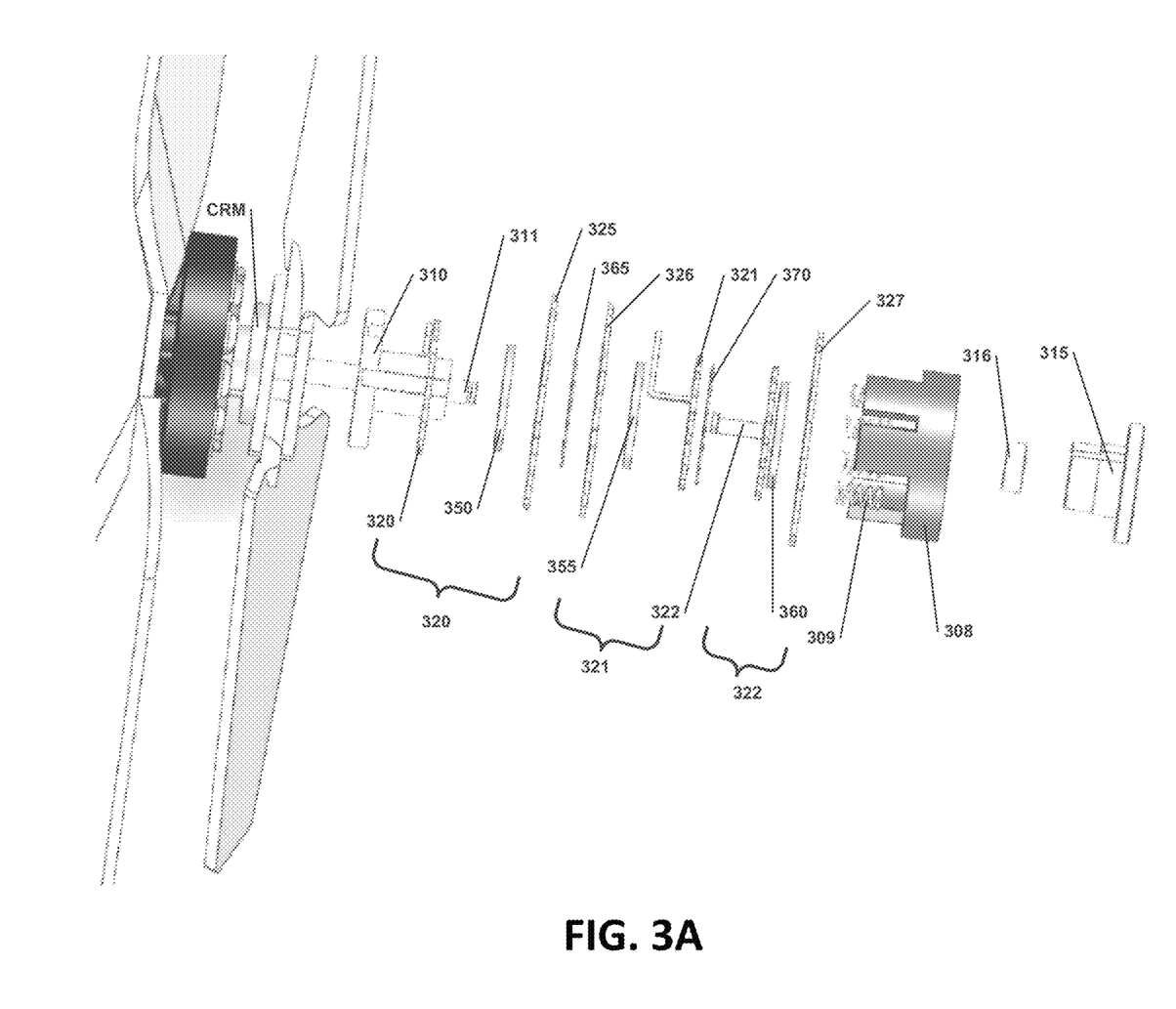
FIG. 3A is an exploded side view of a third embodiment of the subject technology.
Figure 3B:
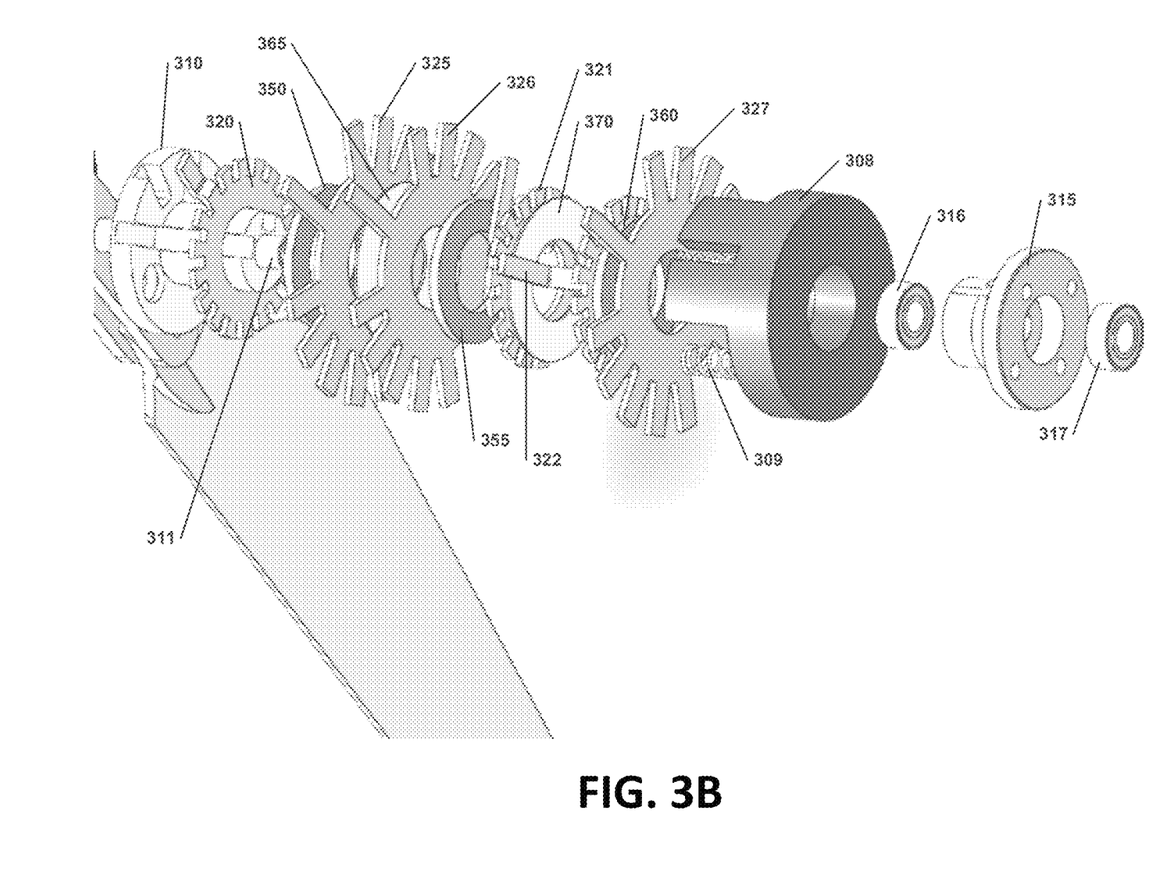
FIG. 3B is an exploded angled view of the third embodiment of the subject technology.

It is important to note in FIGS. 1B and 1C that components 125 with 150 (which rotates on element 120), 126 with 155 (which rotates on element 121), and 127 with 160 (which rotates on element 122) may all be formed/produced as three separate integrated units: that is 125/150; 126/155; and 127/160 may be fabricated as single pieces and not separate elements. The integration is achieved by rivets, spot welding, electrically conductive adhesives, other equivalent means including soldering. One particularly useful combination utilizes brass for components 125, 126, and 127 and a lubricant-containing porous/sintered material (such as readily available Oilite™) for components 150, 155, and 160. This approach simplifies the overall assembly and the process of assembling the subject system. The same unitary fabrication is true for the equivalent elements found in the other embodiments described below and shown in FIGS. 2, 3 and 4. FIG. 4 utilized the unitary fabrication with not only the 125/150; 126/155; and 127/160 pairs, but on equivalent components 120, 121, and 122 (see below for the details).

Figure 3C:
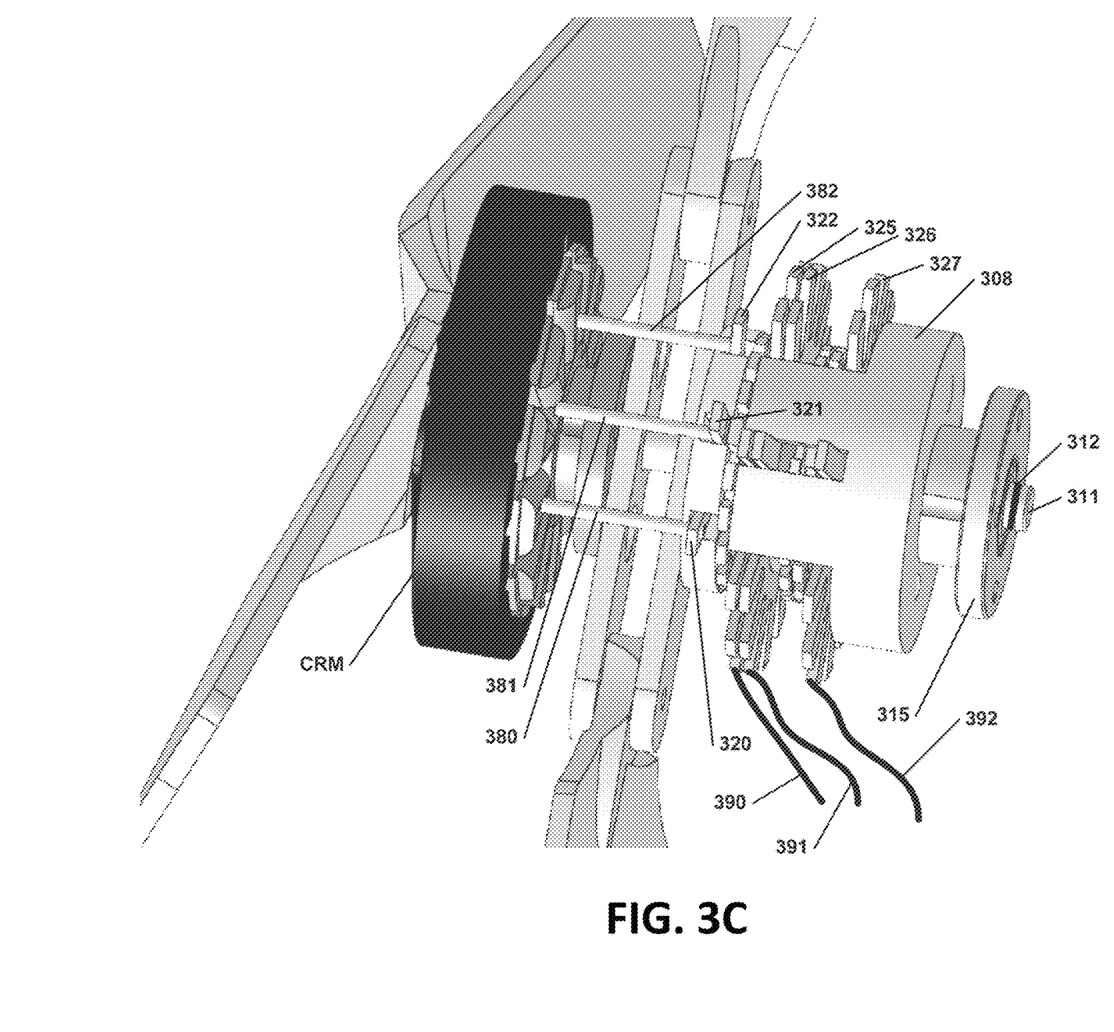
FIG. 3C is a perspective view of the third embodiment of the subject technology in which the subject slip ring assembly is attached to a three phase CR motor and the three connection wires are shown between the CR motor and the subject slip ring assemble.
Figure 4:
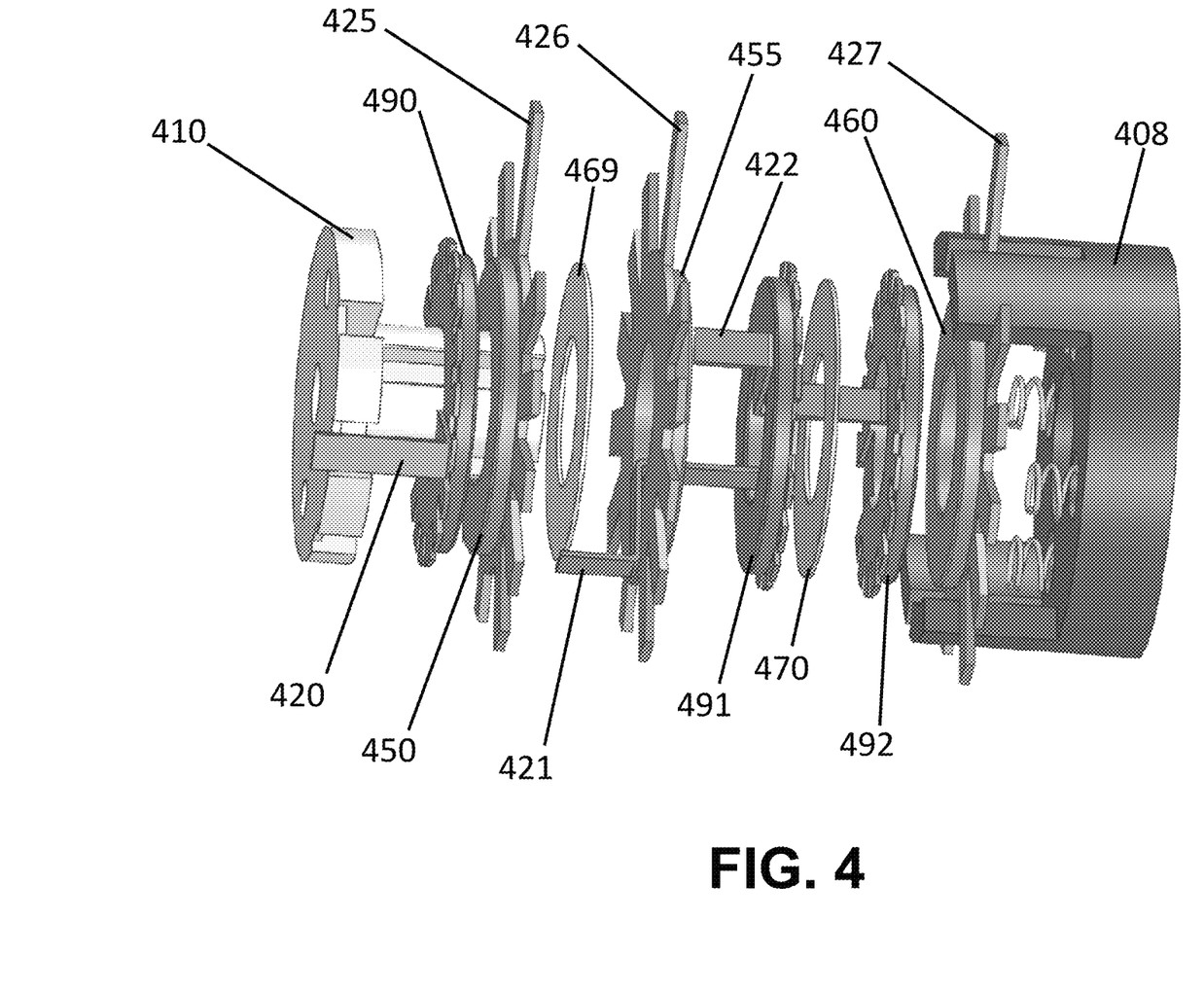
FIG. 4 is an exploded view of a forth embodiment of the subject technology in which each interior CR motor electrical connection disk is formed from two affixed electrically conductive elements with one a porous/sintered with lubricant component and each exterior electrical connection disk is formed from two affixed electrically conductive elements with one a porous/sintered with lubricant component, wherein the two porous/sintered disks with lubricant rotate on each other as the CR motor operates.

Each embodiment of the entire slip ring assembly 5 is held together by the central axle (see 211 in FIGS. 2 and 311 in FIGS. 3A and 3B) that extends from and is attached to the CRM's first rotating member and runs through the spindle (110, 210, and 310 which are secured to the CRM's second rotating member) and terminates within the housing 108 in bearing assemblies (216 and 217 in FIGS. 2, 3A, and 3B) and a securing clip ring (see 312 in FIG. 3C for an equivalent clip ring).

In the first embodiment shown in FIGS. 1A, 1B, and 1C, the interior conductor-connection disk 120, 121, and 122 are fabricated from a CRM-facing electrically conducting member of metal, metal alloy, of the equivalent and preferably a brass alloy for efficient electrical conductivity and a second central axle end facing member that is preferably a porous/sintered bronze, brass, iron alloy, or other electrically conducting metal or non-metal material commonly impregnated with an oil lubricant such as the commonly available Oilite™ material and the electrically conducting spacer disks 150, 155, and 160 that are all fabricated from Oilite™. Again, it is noted that Oilite™ is a porous/sintered bronze, brass, iron alloy, or other electrically conducting metal or non-metal material commonly impregnated with an oil lubricant and readily available from numerous commercial suppliers. Sintered brass with absorbed lubricant is a preferred exemplary material utilized for these components and conducts electricity very efficiently. The oil lubricant may be natural or synthetic. The porous/sintered disks, (such as commercially available Oilite™) are often formed using powder metallurgy so that tiny pores are present in the metal. The pores are then vacuum impregnated with an oil to improve the materials bearing ability. The material holds approximately 20% oil by volume. A common lubricant is SAE 30 oil or other equivalents. Other equivalent materials to Oilite™ may be utilized with the subject technology.

The exterior conductor-connection disks 125, 126, and 127 are normally adhered/fixed to each adjacent electrically conducting spacer disk 150, 155, and 160, respectfully, by gluing, spot brazing, spot welding, soldering in an oven, or like method. With Oilite™ utilized for both the interior connection disks 120, 121, and 122 and the electrically conducting spacer disk 150, 155, and 160 there will be Oilite™ to Oilite™ (lubricated porous/sintered to lubricated porous/sintered) surfaces sliding over one another while the slip ring 5 is operating. With this configuration, no detectable wear has been observed on any of the sliding surfaces in multiple full operational tests, with each test running for 100 hours or more.

FIG. 2 shows an exploded view of a second embodiment of the subject technology. The CRM is depicted with its central axle 211 on the far left of the FIG. 2. The various components seen in FIG. 2 are generally equivalent to those depicted in the first embodiment seen in FIG. 1 (the equivalent identifying component numbers are in the 200s for this embodiment), however, there are several differences. First, the interior connection disks 220, 221, and 222 and the exterior connection disks 225, 226, and 227 are all fabricated from conducting metals such as steel, alloys, and equivalents. Only the electrically conducting spacer disks 250, 255, and 260 are fabricated from a lubricated porous/sintered material such as Oilite™. The exterior connection disks 225, 226, and 227 are located adjacent to the electrically conducting spacer disks 150, 155, and 160, but are not adhered/fixed to them. Additionally, a wave washer 209 serves at the resilient mechanism for applying compression to the conduction assemblies 230, 231, and 232. The supporting structure mount 215 fits with the housing 208 and surrounds a central axle 211 and bearing assemblies 216 and 217.

FIGS. 3A, 3B, and 3C show a third embodiment of the subject technology. The identifying element numbers shown in FIG. 3 are equivalent to those seen in FIGS. 1 and 2 except the FIG. 3 elements are in the 300s. FIGS. 3A and 3B are exploded views of the third embodiment at slightly different viewing angles. The third embodiment comprises the previous described second embodiment with one component changed. The only difference between the second embodiment and the depicted third embodiment is that the resilient mechanism seen in the third embodiment is a set of springs 309 within the housing 308 (not a wave washer 209 as in the second embodiment).

FIG. 3C is useful to show the exterior-to-interior electrical connections that exist for all three embodiments. Interior electrical wires 380, 381, and 382 that connect to and extend from the three phase field coils within the CRM attach to the subject slip ring assembly 5 by connectors 320, 321, and 322. Exterior connectors 325, 326, and 327 receive electrical current via electrical wires 390, 392, and 391. Additionally, the central axle 311 securing mechanism or clip ring 312 that fits with the supporting structure mount 315 is seen in FIG. 3C.

FIG. 4 shows a forth embodiment of the subject technology in which the component configurations are particularly useful for easy and rapid assembly. The identifying element numbers shown in FIG. 4 are equivalent to those seen in FIGS. 1, 2, and 3 except the FIG. 4 elements are in the 400s. The overall configuration is very similar to the embodiments seen in FIGS. 1-3, except in the fourth embodiment the interior (often to a CRM) electrical connector disks 420, 421, and 422 (preferably fabricated from a brass alloy for added conductivity over steel and the like) are heat soldered directly to the lubricated/oiled porous/sintered (Oilite™) spacer disks 490, 491, and 492, respectively. Additionally, the exterior (to controller/power supply) electrical connector disks 425, 426, and 427 (preferably fabricated from a brass alloy for added conductivity over steel and the like) are heat soldered directly to the lubricated/oiled porous/sintered (Oilite™) spacer disks 450, 455, and 460, respectively. Electrical insulation disks 469 and 470 separate the three shown conductor assemblies (420/490 with 425/450 and 421/491 with 426/455 and 422/492 with 427/460).

It should be noted that heat dissipating "fins" are shown in FIGS. 1-4 that extend outward around the periphery of the interior and/or exterior electrical conducting members (e.g.: in FIG. 1 the 125, 126, and 127 exterior conducting members; in FIG. 2 the 220, 221, and 222 interior conducting components and the 225, 226, and 227 exterior conducting components; in FIG. 3 the 320, 321, and 322 interior conducting components and the 325, 326, and 327 exterior conducting components; and in FIG. 4 the 420, 421, and 422 interior conducting components and the 425, 426, and 427 exterior conducting components). These fins may be long or short and function to dissipate heat during operation of the subject slip ring assembly 5. In desired cases, the fins may be missing from some configurations (except one fin on each that is utilized to connect to either the interior electrical connector or the exterior electrical connector), but in most situations where heat is a possible problem the fins do exist for cooling and may take on varied shapes such as the depicted, and for exemplary purposes only and not by way of limitation, rectangular configurations.

Experimental Results

Reference to high current values includes amperages in the multiple 10s of amps and high RPM values include rotational speeds to combined (the sum of the oppositely rotating rotational members in the CRM) 15,000 RPM values and greater.

Extensive operational tests were conducted with the subject slip ring assembly associated with a CRM shown in FIG. 1A. Under the test conditions (shown in TABLE 1) the subject slip ring assembly never exceeded 50° C. during operation. All tests were run for 100 hours of continuous operation. A constant standard voltage/amperage power supply was utilized in the tests.

The operational test results for the CRM (designated as CRM1-2.0 in TABLE 1)-to-Slip Ring System compared with a standard motor and no slip ring assembly showed that the subject slip ring assembly easily operates the CRM at high RPM values (9,510-13,400 total RPM), low temperatures (for both the subject slip ring assembly and the CRM armature region), and allows the CRM to have a greatly increased thrust over a standard motor.

Various embodiments of the subject slip ring assembly technology exist and include a high current and RPM-capable slip ring assembly for use in a selected application for transferring electricity between an exterior environment and an interior environment, comprising: a non-electrically conducting spindle member having a central aperture, wherein the spindle includes an application mounting surface; a central axle having first and second ends that extends within the spindle central aperture with the first axle end proximate the application mounting surface to a supporting structure mount proximate the second axle end; a plurality of conduction assemblies mounted around the spindle with each conduction assembly comprising: an interior conductor-connection disk with a central aperture through which the spindle extends and a mechanism configured for an electrical connection to the interior environment; at least one electrically conducting spacer disk with a central aperture through which the spindle extends; and an exterior conductor-connection disk with a central aperture through which the spindle extends and a mechanism configured for an electrical connection to the exterior environment; a plurality of electrical insulator disks, each insulator disk having a central aperture through which the spindle extends and positioned between each adjacent conduction assembly; a non-electrically conducting conductor housing having a central aperture through which the spindle extends and is positioned proximate the axle first end and to the supporting structure mount, wherein each exterior conductor-connection disk is secured to prevent rotation during operation of the slip ring assembly; a resilient mechanism configured for applying compression to the plurality of conduction assemblies to maintain electrical transmission during operation of the slip ring assembly; and the supporting structure mount rotationally secured to the central axle and secured to the housing. Further comprising this embodiment include each electrically conducting spacer disk comprising an electrically conducting and lubricated porous/sintered disk and each interior conductor-connection disk and the electrically conducting spacer disk both comprise an electrically conducting and lubricated porous/sintered disk. Also, the interior conductor-connection disk and the electrically conducting spacer disk may both comprise an electrically conducting and lubricated porous/sintered disk and the electrically conducting and lubricated porous/sintered disk is adhered to the exterior conductor-connection disk and rotates during operation with the exterior conductor-connection disk. Additionally, for the slip ring assembly the resilient mechanism may comprises one or more springs or a wave washer mounted around the spindle. Further, cooling fins may extend from the interior conductor-connection disk and the exterior conductor-connection disk.

Another embodiment of the subject technology is a high current and RPM-capable slip ring assembly for use in a selected application for transferring electricity between an exterior environment and an interior environment, comprising: a non-electrically conducting spindle member having a central aperture, wherein the spindle includes an application mounting surface; a central axle having first and second ends that extends within the spindle central aperture with the first axle end proximate the application mounting surface to a supporting structure mount proximate the second axle end; a plurality of conduction assemblies mounted around the spindle with each conduction assembly comprising: an interior conductor-connection disk with a central aperture through which the spindle extends and a mechanism configured for an electrical connection to the interior environment; at least one electrically conducting electrically and lubricated porous/sintered spacer disk with a central aperture through which the spindle extends; and an exterior conductor-connection disk with a central aperture through which the spindle extends and mechanism configured for an electrical connection to the exterior environment; a plurality of electrical insulator disks, each insulator disk having a central aperture through which the spindle extends and positioned between each adjacent conduction assembly; a non-electrically conducting conductor housing having a central aperture through which the spindle extends and is positioned proximate the axle first end and to the supporting structure mount, wherein each exterior conductor-connection disk is secured to prevent rotation during the operation on the slip ring assembly; a resilient mechanism configured for applying compression to the plurality of conduction assemblies to maintain electrical transmission during operation of the slip ring assembly; and the supporting mount rotationally secured to the central axle and secured to the housing. Also, the interior conductor-connection disk and the electrically conducting spacer disk may both comprise an electrically conducting and lubricated porous/sintered disk or the interior conductor-connection disk and the electrically conducting spacer disk both comprise an electrically conducting and lubricated porous/sintered disk and the electrically conducting and lubricated porous/sintered disk spacer disk is adhered to the exterior conductor-connection disk and rotates during operation with the exterior conductor-connection disk. Additionally, the subject technology may have the resilient mechanism comprising one or more springs or a wave washer mounted around the spindle. Further, the subject assembly may include cooling fins extending from the interior conductor-connection disk and cooling fins extending from the exterior conductor-connection disk.

Yet another embodiment of the subject technology is a high current and RPM-capable slip ring assembly for transferring electricity between an external environment and a CRM, comprising: a non-electrically conducting spindle having a central aperture and a CRM mounting surface; a central axle having first and second ends and extending from proximate the CRM mounting surface within the spindle to a supporting structure mount proximate the second axle end; a plurality of conduction assemblies mounted to the spindle with each conduction assembly comprising: an interior conductor-connection disk with a central aperture through which the spindle extends and a mechanism configured for an electrical connection to the CRM; a first electrically conducting and lubricated porous/sintered disk spacer disk with a central aperture through which the spindle extends that is secured to the interior conductor-connection disk; an exterior conductor-connection disk with a central aperture through which the spindle extends and a mechanism configured for an electrical connection to the external environment; and a second electrically conducting and lubricated porous/sintered disk spacer disk with a central aperture through which the spindle extends that is secured to the exterior conductor-connection disk, where during operation of the slip ring assembly the first and second electrically conducting and lubricated porous/sintered disks rotate next to one another to transfer electrical current from the external environment to the CRM; a plurality of electrical insulator disks, each insulator disk having a central aperture through which the spindle extends and positioned between each adjacent conduction assembly; a non-electrically conducting conductor housing having a central aperture through which the spindle extends and is positioned proximate the axle first end and to the supporting structure mount, wherein each exterior conductor-connection disk is secured to prevent rotation during operation of the slip ring assembly; a resilient mechanism configured for applying compression to the plurality of conduction assemblies to maintain electrical transmission during operation of the slip ring assembly; and the supporting structure mount rotationally secured to the central axle and secured to the housing. Additionally, cooling fins may extend from the interior conductor-connection disk and the exterior conductor-connection disk.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. A high current and RPM-capable slip ring assembly for use in a selected application for transferring electricity between an exterior environment and an interior environment, comprising: (a) a non-electrically conducting spindle member having a central aperture, wherein said spindle includes an application mounting surface; (b) a central axle having first and second ends that extends within said spindle central aperture with said first axle end proximate said application mounting surface to a supporting structure mount proximate said second axle end; (c) a plurality of conduction assemblies mounted around said spindle with each conduction assembly comprising: (i) an interior conductor-connection disk with a central aperture through which said spindle extends and a mechanism configured for an electrical connection to the interior environment; (ii) at least one electrically conducting spacer disk with a central aperture through which said spindle extends; and (iii) an exterior conductor-connection disk with a central aperture through which said spindle extends and a mechanism configured for an electrical connection to the exterior environment; (d) a plurality of electrical insulator disks, each said insulator disk having a central aperture through which said spindle extends and positioned between each adjacent conduction assembly; (e) a non-electrically conducting conductor housing having a central aperture through which said spindle extends and is positioned proximate said axle first end and to said supporting structure mount, wherein each said exterior conductor-connection disk is secured to prevent rotation during operation of the slip ring assembly; (f) a resilient mechanism configured for applying compression to said plurality of conduction assemblies to maintain electrical transmission during operation of the slip ring assembly; and (g) said supporting structure mount rotationally secured to said central axle and secured to said housing.

2. A slip ring assembly according to any preceding or following embodiment, wherein each said electrically conducting spacer disk comprises an electrically conducting and lubricated porous/sintered disk.

3. A slip ring assembly according to any preceding or following embodiment, wherein said interior conductor-connection disk and said electrically conducting spacer disk both comprise an electrically conducting and lubricated porous/sintered disk.

4. A slip ring assembly according to any preceding or following embodiment, wherein said interior conductor-connection disk and said electrically conducting spacer disk both comprise an electrically conducting and lubricated porous/sintered disk and said electrically conducting and lubricated porous/sintered disk is adhered to said exterior conductor-connection disk and rotates during operation with said exterior conductor-connection disk.

5. A slip ring assembly according to any preceding or following embodiment, wherein said resilient mechanism comprises one or more springs.

6. A slip ring assembly according to any preceding or following embodiment, wherein said resilient mechanism comprises a wave washer mounted around said spindle.

7. A slip ring assembly according to any preceding or following embodiment, further comprising cooling fins extending from said interior conductor-connection disk.

8. A slip ring assembly according to any preceding or following embodiment, further comprising cooling fins extending from said exterior conductor-connection disk.

9. A high current and RPM-capable slip ring assembly for use in a selected application for transferring electricity between an exterior environment and an interior environment, comprising: (a) a non-electrically conducting spindle member having a central aperture, wherein said spindle includes an application mounting surface; (b) a central axle having first and second ends that extends within said spindle central aperture with said first axle end proximate said application mounting surface to a supporting structure mount proximate said second axle end; (c) a plurality of conduction assemblies mounted to around said spindle with each conduction assembly comprising: (i) an interior conductor-connection disk with a central aperture through which said spindle extends and a mechanism configured for an electrical connection to the interior environment; (ii) at least one electrically conducting electrically and lubricated porous/sintered spacer disk with a central aperture through which said spindle extends; and (iii) an exterior conductor-connection disk with a central aperture through which said spindle extends and mechanism configured for an electrical connection to the exterior environment; (d) a plurality of electrical insulator disks, each said insulator disk having a central aperture through which said spindle extends and positioned between each adjacent conduction assembly; (e) a non-electrically conducting conductor housing having a central aperture through which said spindle extends and is positioned proximate said axle first end and to said supporting structure mount, wherein each said exterior conductor-connection disk is secured to prevent rotation during the operation on the slip ring assembly; (f) a resilient mechanism configured for applying compression to said plurality of conduction assemblies to maintain electrical transmission during operation of the slip ring assembly; and (g) said supporting mount rotationally secured to said central axle and secured to said housing.

10. A slip ring assembly according to any preceding or following embodiment, wherein said interior conductor-connection disk and said electrically conducting spacer disk both comprise an electrically conducting and lubricated porous/sintered disk.

11. A slip ring assembly according to any preceding or following embodiment, wherein said interior conductor-connection disk and said electrically conducting spacer disk both comprise an electrically conducting and lubricated porous/sintered disk and said electrically conducting and lubricated porous/sintered disk spacer disk is adhered to said exterior conductor-connection disk and rotates during operation with said exterior conductor-connection disk.

12. A slip ring assembly according to any preceding or following embodiment, wherein said resilient mechanism comprises one or more springs.

13. A slip ring assembly according to any preceding or following embodiment, wherein said resilient mechanism comprises a wave washer mounted around said spindle.

14. A slip ring assembly according to any preceding or following embodiment, further comprising cooling fins extending from said interior conductor-connection disk.

15. A slip ring assembly according to any preceding or following embodiment, further comprising cooling fins extending from said exterior conductor-connection disk.

16. A high current and RPM-capable slip ring assembly for transferring electricity between an external environment and a counter-rotating (CRM) motor, comprising: (a) a non-electrically conducting spindle having a central aperture and a CRM mounting surface; (b) a central axle having first and second ends and extending from proximate said CRM mounting surface within said spindle to a supporting structure mount proximate said second axle end; (c) a plurality of conduction assemblies mounted to said spindle with each conduction assembly comprising: (i) an interior conductor-connection disk with a central aperture through which said spindle extends and a mechanism configured for an electrical connection to the CRM; (ii) a first electrically conducting and lubricated porous/sintered disk spacer disk with a central aperture through which said spindle extends that is secured to said interior conductor-connection disk; (iii) an exterior conductor-connection disk with a central aperture through which said spindle extends and a mechanism configured for an electrical connection to the external environment; and (iv) a second electrically conducting and lubricated porous/sintered disk spacer disk with a central aperture through which said spindle extends that is secured to said exterior conductor-connection disk, where during operation of the slip ring assembly said first and second electrically conducting and lubricated porous/sintered disks rotate next to one another to transfer electrical current from the external environment to the CRM; (d) a plurality of electrical insulator disks, each said insulator disk having a central aperture through which said spindle extends and positioned between each adjacent conduction assembly; (e) a non-electrically conducting conductor housing having a central aperture through which said spindle extends and is positioned proximate said axle first end and to said supporting structure mount, wherein each said exterior conductor-connection disk is secured to prevent rotation during operation of the slip ring assembly; (f) a resilient mechanism configured for applying compression to said plurality of conduction assemblies to maintain electrical transmission during operation of the slip ring assembly; and (g) said supporting structure mount rotationally secured to said central axle and secured to said housing.

17. A slip ring assembly according to any preceding or following embodiment, further comprising cooling fins extending from said interior conductor-connection disk.

18. A slip ring assembly according to any preceding or following embodiment, further comprising cooling fins extending from said exterior conductor-connection disk.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

CRM Tests with the First Embodiment Subject Slip Ring Assembly

| Motor | RPM Front/Back Propellers | Amb. Temp. | Thrust (lbs) | Voltage | Amps. | Armature Temp. | Wattage | % increase in Thrust |
|---|---|---|---|---|---|---|---|---|
| Standard | 5350 | 34 C. | 2.5 | 22.3 | 8.5 | 100 C. | 189.55 | |
| CRM1-2.0 | 5050/4460 | 34 C. | 3.1 | 22.3 | 8.5 | 45 C. | 189.55 | 24% |
| Standard | 5500 | 23 C. | 3 | 22.3 | 9.5 | 100 C. | 211.85 | |
| CRM1-2.0 | 5200/4664 | 23 C. | 3.8 | 30 | 9.5 | 50 C. | 285 | 27% |
| CRM1-2.0 | 5440/5033 | 23 C. | 4.3 | 30 | 11 | 50 C. | 330 | |
| Standard | 6056 | 23 C. | 3.5 | 22.3 | 13.7 | 120 C. | 305.51 | |
| CRM1-2.0 | 6400/6000 | 34 C. | 5 | 22.3 | 15.9 | 50 C. | 354.57 | 43% |
| CRM1-2.0 | 6850/6550 | 23 C. | 7 | 30 | 23 | 120 C. | 690 | |

What is claimed is:

1. A high current and RPM-capable slip ring assembly for use in a selected application for transferring electricity between an exterior environment and an interior environment, comprising:
   (a) a non-electrically conducting spindle member having a central aperture, wherein said spindle includes an application mounting surface;
   (b) a central axle having first and second ends that extends within said spindle central aperture with said first axle end proximate said application mounting surface to a supporting structure mount proximate said second axle end;
   (c) a plurality of conduction assemblies mounted around said spindle with each conduction assembly comprising:
      (i) an interior conductor-connection disk with a central aperture through which said spindle extends and a mechanism configured for an electrical connection to the interior environment;
      (ii) at least one electrically conducting spacer disk with a central aperture through which said spindle extends; and
      (iii) an exterior conductor-connection disk with a central aperture through which said spindle extends and a mechanism configured for an electrical connection to the exterior environment;
   (d) a plurality of electrical insulator disks, each said insulator disk having a central aperture through which said spindle extends and positioned between each adjacent conduction assembly;
   (e) a non-electrically conducting conductor housing having a central aperture through which said spindle extends and is positioned proximate said axle first end and to said supporting structure mount, wherein each said exterior conductor-connection disk is secured to prevent rotation during operation of the slip ring assembly;

(f) a resilient mechanism configured for applying compression to said plurality of conduction assemblies to maintain electrical transmission during operation of the slip ring assembly; and
(g) said supporting structure mount rotationally secured to said central axle and secured to said housing.

2. A slip ring assembly according to claim 1, wherein each said electrically conducting spacer disk comprises an electrically conducting and lubricated porous/sintered disk.

3. A slip ring assembly according to claim 1, wherein said interior conductor-connection disk and said electrically conducting spacer disk both comprise an electrically conducting and lubricated porous/sintered disk.

4. A slip ring assembly according to claim 1, wherein said interior conductor-connection disk and said electrically conducting spacer disk both comprise an electrically conducting and lubricated porous/sintered disk and said electrically conducting and lubricated porous/sintered disk is adhered to said exterior conductor-connection disk and rotates during operation with said exterior conductor-connection disk.

5. A slip ring assembly according to claim 1, wherein said resilient mechanism comprises one or more springs.

6. A slip ring assembly according to claim 1, wherein said resilient mechanism comprises a wave washer mounted around said spindle.

7. A slip ring assembly according to claim 1, further comprising cooling fins extending from said interior conductor-connection disk.

8. A slip ring assembly according to claim 1, further comprising cooling fins extending from said exterior conductor-connection disk.

9. A high current and RPM-capable slip ring assembly for use in a selected application for transferring electricity between an exterior environment and an interior environment, comprising:
(a) a non-electrically conducting spindle member having a central aperture, wherein said spindle includes an application mounting surface;
(b) a central axle having first and second ends that extends within said spindle central aperture with said first axle end proximate said application mounting surface to a supporting structure mount proximate said second axle end;
(c) a plurality of conduction assemblies mounted to around said spindle with each conduction assembly comprising:
(i) an interior conductor-connection disk with a central aperture through which said spindle extends and a mechanism configured for an electrical connection to the interior environment;
(ii) at least one electrically conducting electrically and lubricated porous/sintered spacer disk with a central aperture through which said spindle extends; and
(iii) an exterior conductor-connection disk with a central aperture through which said spindle extends and mechanism configured for an electrical connection to the exterior environment;
(d) a plurality of electrical insulator disks, each said insulator disk having a central aperture through which said spindle extends and positioned between each adjacent conduction assembly;
(e) a non-electrically conducting conductor housing having a central aperture through which said spindle extends and is positioned proximate said axle first end and to said supporting structure mount, wherein each said exterior conductor-connection disk is secured to prevent rotation during the operation on the slip ring assembly;
(f) a resilient mechanism configured for applying compression to said plurality of conduction assemblies to maintain electrical transmission during operation of the slip ring assembly; and
(g) said supporting mount rotationally secured to said central axle and secured to said housing.

10. A slip ring assembly according to claim 9, wherein said interior conductor-connection disk and said electrically conducting spacer disk both comprise an electrically conducting and lubricated porous/sintered disk.

11. A slip ring assembly according to claim 9, wherein said interior conductor-connection disk and said electrically conducting spacer disk both comprise an electrically conducting and lubricated porous/sintered disk and said electrically conducting and lubricated porous/sintered disk spacer disk is adhered to said exterior conductor-connection disk and rotates during operation with said exterior conductor-connection disk.

12. A slip ring assembly according to claim 9, wherein said resilient mechanism comprises one or more springs.

13. A slip ring assembly according to claim 9, wherein said resilient mechanism comprises a wave washer mounted around said spindle.

14. A slip ring assembly according to claim 9, further comprising cooling fins extending from said interior conductor-connection disk.

15. A slip ring assembly according to claim 9, further comprising cooling fins extending from said exterior conductor-connection disk.

16. A high current and RPM-capable slip ring assembly for transferring electricity between an external environment and a counter-rotating (CRM) motor, comprising:
(a) a non-electrically conducting spindle having a central aperture and a CRM mounting surface;
(b) a central axle having first and second ends and extending from proximate said CRM mounting surface within said spindle to a supporting structure mount proximate said second axle end;
(c) a plurality of conduction assemblies mounted to said spindle with each conduction assembly comprising:
(i) an interior conductor-connection disk with a central aperture through which said spindle extends and a mechanism configured for an electrical connection to the CRM;
(ii) a first electrically conducting and lubricated porous/sintered disk spacer disk with a central aperture through which said spindle extends that is secured to said interior conductor-connection disk;
(iii) an exterior conductor-connection disk with a central aperture through which said spindle extends and a mechanism configured for an electrical connection to the external environment; and
(iv) a second electrically conducting and lubricated porous/sintered disk spacer disk with a central aperture through which said spindle extends that is secured to said exterior conductor-connection disk, where during operation of the slip ring assembly said first and second electrically conducting and lubricated porous/sintered disks rotate next to one another to transfer electrical current from the external environment to the CRM;

(d) a plurality of electrical insulator disks, each said insulator disk having a central aperture through which said spindle extends and positioned between each adjacent conduction assembly;

(e) a non-electrically conducting conductor housing having a central aperture through which said spindle extends and is positioned proximate said axle first end and to said supporting structure mount, wherein each said exterior conductor-connection disk is secured to prevent rotation during operation of the slip ring assembly;

(f) a resilient mechanism configured for applying compression to said plurality of conduction assemblies to maintain electrical transmission during operation of the slip ring assembly; and (g) said supporting structure mount rotationally secured to said central axle and secured to said housing.

17. A slip ring assembly according to claim 16, further comprising cooling fins extending from said interior conductor-connection disk.

18. A slip ring assembly according to claim 16, further comprising cooling fins extending from said exterior conductor-connection disk.

* * * * *